(12) United States Patent
Johnson (10) Patent No.: US 10,030,796 B2
(45) Date of Patent: Jul. 24, 2018

(54) VACUUM HOSE COUPLING WITH QUICK LOCK FEATURE

(71) Applicant: CNH Industrial America LLC, New Holland, PA (US)

(72) Inventor: Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/788,287

(22) Filed: Jun. 30, 2015

(65) Prior Publication Data

US 2017/0000017 A1    Jan. 5, 2017

(51) Int. Cl.

| A01C 7/20 | (2006.01) |
|---|---|
| F16L 21/06 | (2006.01) |
| F16L 21/08 | (2006.01) |
| F16L 21/00 | (2006.01) |
| A01C 7/04 | (2006.01) |
| A01C 7/08 | (2006.01) |

(52) U.S. Cl.
CPC ............ *F16L 21/007* (2013.01); *A01C 7/042* (2013.01); *A01C 7/082* (2013.01); *F16L 21/08* (2013.01)

(58) Field of Classification Search
CPC ......... F16L 33/225; F16L 33/22; F16L 21/08; F16L 21/007; A01C 7/081; A01C 7/082; A01C 7/084; A01C 7/042
USPC ..................................... 285/255–257, 242, 7
See application file for complete search history.

(56) References Cited

U.S. PATENT DOCUMENTS

| 3,589,673 A | | 6/1971 | Cruse | |
|---|---|---|---|---|
| 3,634,905 A | * | 1/1972 | Boyd | ........................ A47L 5/30 |
| | | | | 15/350 |
| 3,695,632 A | * | 10/1972 | Kruse | ..................... F16L 37/05 |
| | | | | 285/252 |
| 3,873,062 A | | 3/1975 | Johnson et al. | |
| 4,063,760 A | | 12/1977 | Moreiras | |
| 4,392,678 A | | 7/1983 | Adamczyk | |
| 4,451,070 A | * | 5/1984 | Sauer | ...................... F16L 33/22 |
| | | | | 285/242 |
| 4,673,199 A | | 6/1987 | Renfrew | |
| 4,770,446 A | | 9/1988 | Keller | |
| 5,170,909 A | * | 12/1992 | Lundie | ................... A01C 7/046 |
| | | | | 221/211 |
| 5,310,224 A | | 5/1994 | Tenglund | |

(Continued)

*Primary Examiner* — John Weiss
(74) *Attorney, Agent, or Firm* — Rebecca L. Henkel; Rickard K. DeMille (57) ABSTRACT

An agricultural planter includes a chassis, a pneumatic system carried by the chassis, and a row unit carried by the chassis. The row unit includes a unit body, a metering unit carried by the unit body, a flexible coupling locked onto the port by an inner lip formed on an inner surface of the coupling. The metering unit includes a port with a channel formed within the port. The coupling has a sliding region formed on an outer surface of the coupling. The row unit also includes a locking ring bound within the sliding region of the coupling. The locking ring is slidable across the sliding region between a locked position and an unlocked position, such that the locking ring prevents the coupling from deforming to allow the inner lip off the port in the locked position. The row unit also includes a hose connecting the pneumatic system to the channel of the port through the coupling.

17 Claims, 11 Drawing Sheets

(56) References Cited

U.S. PATENT DOCUMENTS

| | | | |
|---|---|---|---|
| 5,868,435 A * | 2/1999 | Bartholomew | F16L 27/0816 |
| | | | 285/23 |
| 6,073,973 A | 6/2000 | Boscaljon et al. | |
| 6,231,085 B1 | 5/2001 | Olson | |
| 6,416,085 B1 | 7/2002 | Markovic | |
| 6,715,800 B1 * | 4/2004 | Hennig | F16L 33/225 |
| | | | 285/256 |
| 7,090,257 B2 | 8/2006 | Werth | |
| 7,163,238 B1 * | 1/2007 | Mittersteiner | B25B 27/10 |
| | | | 285/242 |
| 7,566,077 B2 | 7/2009 | Tsurumi | |
| 8,240,719 B2 | 8/2012 | Udhöfer et al. | |
| 9,131,815 B2 * | 9/2015 | Genoa | A47L 5/225 |
| 9,493,951 B2 * | 11/2016 | Sorkin | E04C 5/00 |
| 2002/0038953 A1 * | 4/2002 | Mcnab | F16L 37/091 |
| | | | 285/255 |
| 2008/0012337 A1 | 1/2008 | De Bosscher et al. | |
| 2010/0327579 A1 * | 12/2010 | Montena | F16L 33/225 |
| | | | 285/382 |
| 2014/0001745 A1 | 1/2014 | Lehmann et al. | |
| 2014/0158217 A1 * | 6/2014 | Stanley | F16L 19/0237 |
| | | | 137/15.08 |
| 2016/0153594 A1 * | 6/2016 | Anderson | A01G 25/00 |
| | | | 285/140.1 |

* cited by examiner

VACUUM HOSE COUPLING WITH QUICK LOCK FEATURE

BACKGROUND OF THE INVENTION

1. Field of the Invention

The present invention relates to agricultural planters, and, more particularly, to couplings for metering units.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter independently places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, also called an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

The metering device of the planter is typically connected to a source of either vacuum or pressurized air to select a seed for planting. In order to connect the metering device to the vacuum or pressurized air, which can be provided by a pneumatic system, a port of the metering device is connected to the pneumatic system by a hose. In order to maintain the differential air pressure in the hose, a coupling is used to create an airtight seal between the hose and the port of the metering device. The coupling can be held on to the port with a friction fit, but such a fit is prone to becoming disconnected as the row unit articulates up and down through the field. Further, the friction fit can make it difficult to unlock the hose from the metering device.

What is needed in the art is a coupling that can secure a hose to a metering device and be quickly unlocked.

SUMMARY OF THE INVENTION

The present invention provides a coupling with an inner lip that locks onto and unlocks from a port of a metering device by sliding a locking ring along an outer surface of the coupling.

The invention in one form is directed to an agricultural planter including: a chassis; a pneumatic system carried by the chassis; and a row unit carried by the chassis. The row unit includes: a unit body; a metering unit carried by the unit body and having a port with a channel formed therein; a flexible coupling locked onto the port by an inner lip formed on an inner surface of the coupling, the coupling having a sliding region formed on an outer surface of said coupling; a locking ring bound within the sliding region of the coupling, the locking ring being slidable across the sliding region between a locked position and an unlocked position, the locking ring preventing the coupling from deforming to allow the inner lip off the port in the locked position; and a hose connecting the pneumatic system to the channel of the port through the coupling.

The invention in another form is directed to a locking mechanism including: a locking surface; a flexible coupling locked onto the locking surface by an inner lip formed on an inner surface of the coupling, the coupling having a sliding region formed on an outer surface of the coupling; and a locking ring bound within the sliding region of the coupling, the locking ring being slidable across the sliding region between a locked position and an unlocked position, the locking ring preventing the coupling from deforming to allow the inner lip off the locking surface in the locked position.

An advantage of the present invention is the coupling can be quickly unlocked from the metering device by sliding the locking ring into the unlocked position.

Another advantage is the locking mechanism can be produced relatively cheaply.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
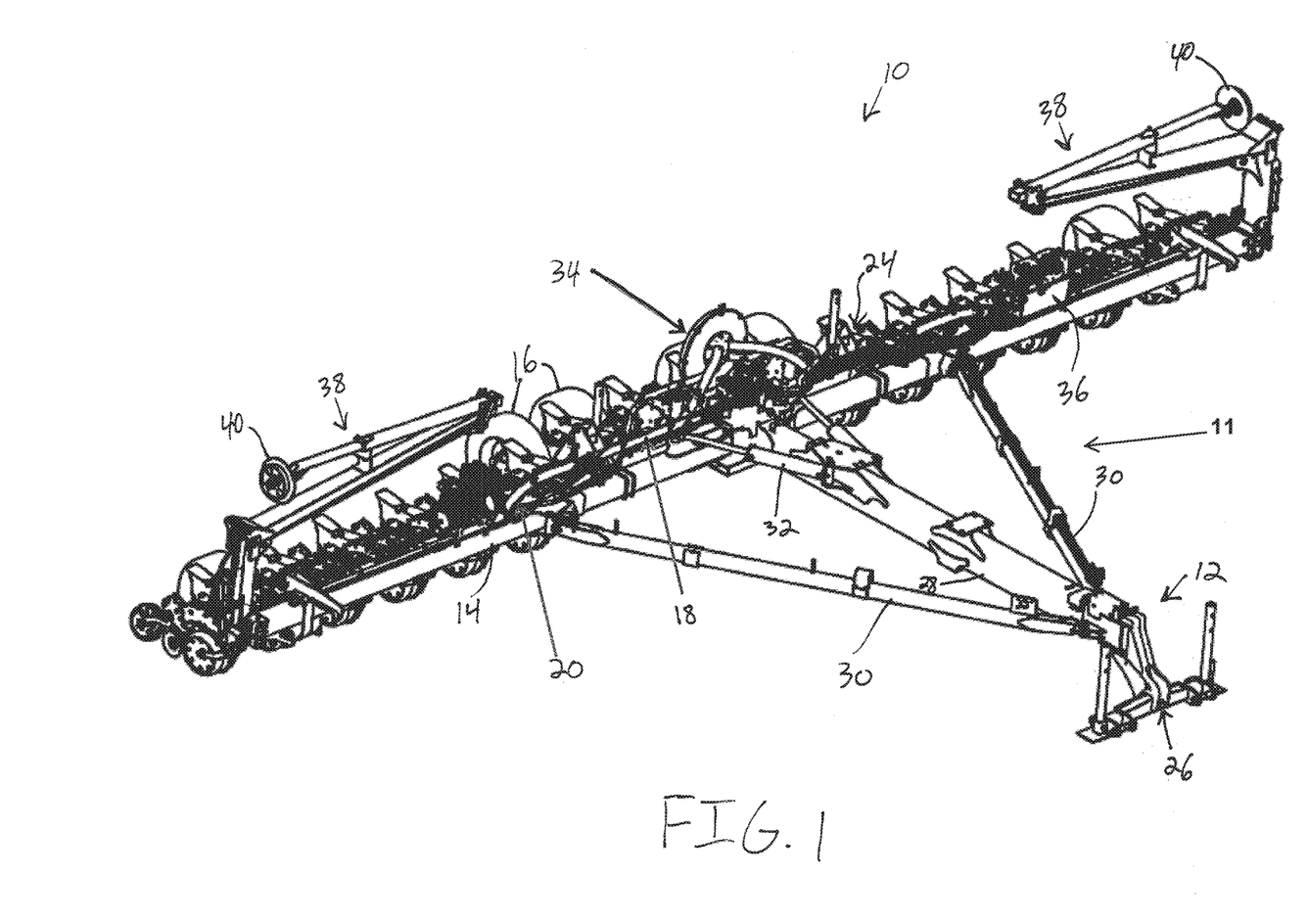
FIG. 1 is a perspective view of an embodiment of an agricultural planter according to the present invention.

Referring now to the drawings, and more particularly to FIG. 1, there is shown an embodiment of an agricultural planter 10 according to the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks (not shown) carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines throughout to support various cylinders and systems that are included on the planter 10. For example, a pneumatic system 34 can be connected to the tool bar 14 by a vacuum pipe 18 and a vacuum hose 20 and an electric generator 36 also connected to the tool bar 14. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly (not shown) can also be mounted to the back of the planter 10 to allow an operator to access the storage tanks.

Figure 2:
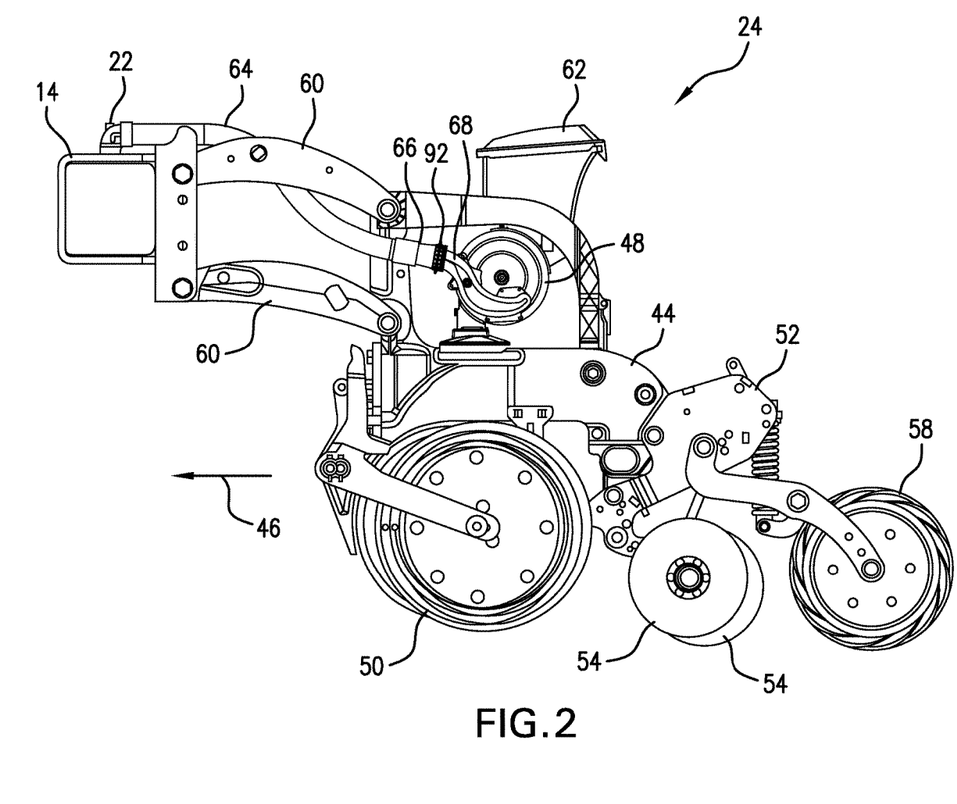
FIG. 2 is a side view of an embodiment of a row unit carried by the agricultural planter shown in FIG. 1.

Referring now to FIG. 2, an embodiment of an individual row unit 24 is shown connected to the tool bar 14. As can be seen, the row unit 24 generally includes a unit body 44 that can be carried by the chassis 11 in a direction of travel, signified by arrow 46, a metering device 48 carried by the unit body 44, a furrowing disc 50 connected to the unit body 44, a mounting body 52 connected to the unit body 44, closing discs 54 carried by the unit body 44, and a pressing wheel 58 connected to the mounting body 52 that is positionable behind the closing discs 54. As can be seen, the unit body 44 can have toolbar connecting arms 60 bolted thereon that can be connected to the tool bar 14 in a parallel linkage arrangement so that the row unit 24 can be carried by the chassis 11 in the direction of travel 46. In this sense, the unit body 44 acts as a row unit chassis to keep the various components of the row unit 24 together during operation.

The metering device 48 carried by the unit body 44 is configured to receive seed from a unit storage tank 62 (also known as a mini-hopper) that is carried by the unit body 44. The metering device 48 can be configured as any type of device which is capable of controllably metering out seeds to be planted by the row unit 24 during operation of the planter 10. For example, the metering device 48 can utilize a metering disk (not shown) in combination with a vacuum formed in the metering device 48 to selectively pull seeds into a seed drop (not shown), where the vacuum is released and gravity causes the seed to drop into soil below. Other types of metering devices are known and could readily be adopted into the row unit 24 of the present invention. The metering device 48 is connected to the pneumatic system 34, which can be a vacuum fan as shown in FIG. 1, by a hose 64 that is connected to the metering device 48 through a coupling 66 that locks onto a port 68 of the metering device 48, which will be described further herein. The hose 64 can be connected to the vacuum fan 34 by the vacuum hose 20 previously described and shown in FIG. 1 via a vacuum coupling 22 connected to the tool bar 14. It should be appreciated that pressurized air or a vacuum can be provided to the metering device 48 through the hose 64 and the hose 64 can be provided with the pressurized air or vacuum in any suitable manner.

Figure 3:
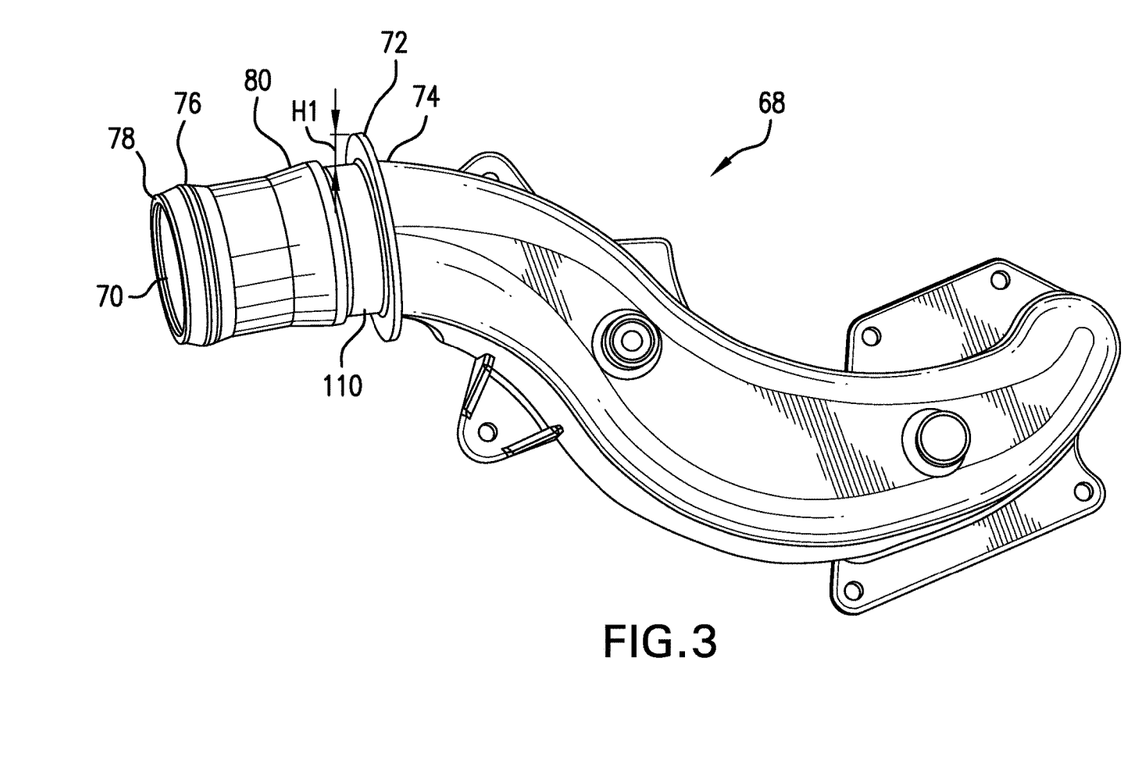
FIG. 3 is a side view of an embodiment of a port of a metering device included in the row unit shown in FIG. 2.
Figure 10:
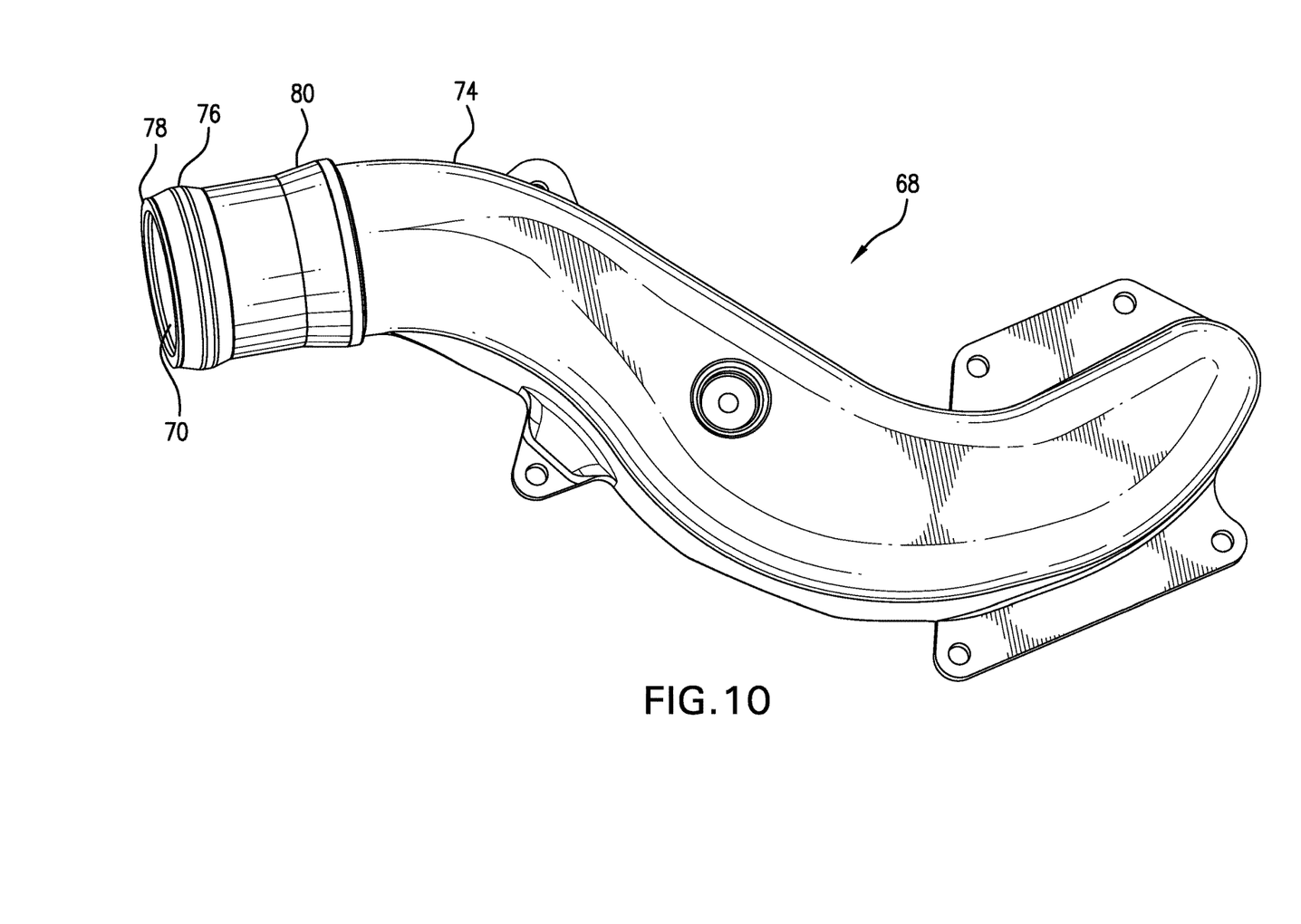
FIG. 10 is a side view of the port shown in FIG. 3 formed without a port lip.

Referring now to FIG. 3, the port 68 of the metering device 48 is shown in better detail. As can be seen, the port 68 includes a channel 70 formed therein that extends into the metering device 48 to provide pressurized air or vacuum to the metering device 48. Optionally, the port 68 can include a port lip 72 formed on an outer surface 74 of the port 68 that circumferentially extends around the port 68 and has a port lip height H1 relative to the outer surface 74. The port 68 can also be formed without the port lip 72, as shown in FIG. 10. The port 68 can further include a flared portion 76 formed at an end 78 of the port 68 that has an increased diameter relative to the outer surface 74, the significance of which will be further described herein. A ramped portion 80 can be formed between the flared portion 76 and the port lip 72 that gradually increases in diameter from one end closer to the flared portion 76 to its other end closer to the port lip 72.

Figure 4A:
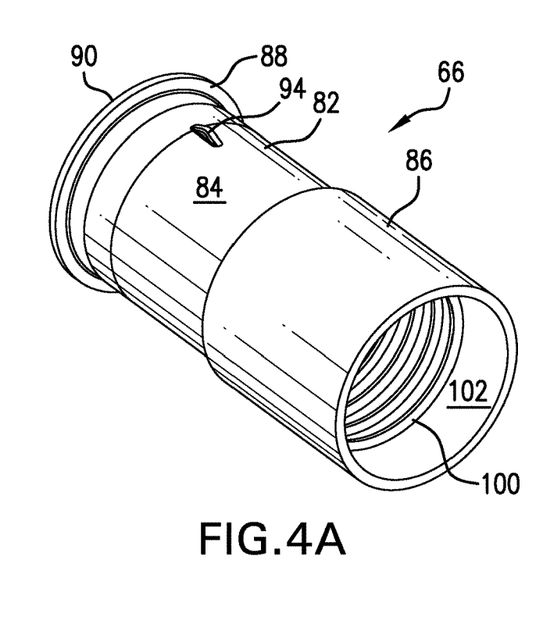
FIG. 4A is a perspective view of an embodiment of a coupling according to the present invention.
Figure 4B:
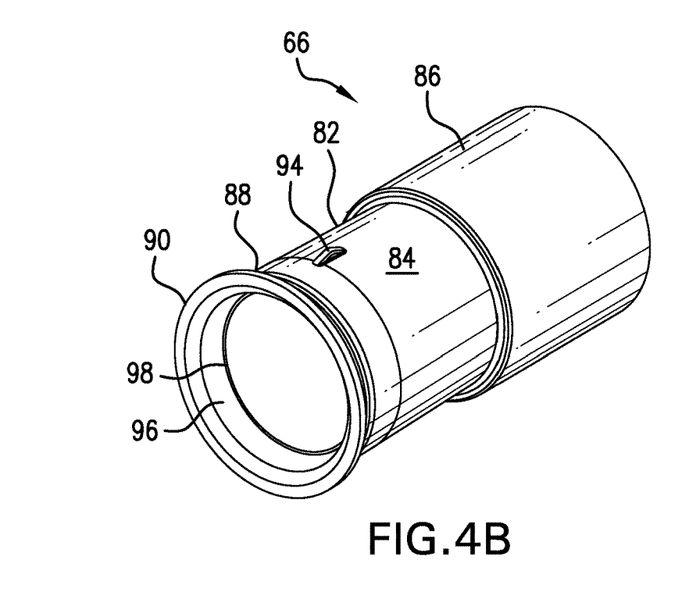
FIG. 4B is another perspective view of the coupling shown in FIG. 4A.

Referring now to FIGS. 4A and 4B, an embodiment of the coupling 66 is shown. As can be seen, the coupling 66 can approximately define a cylinder of varying diameters along a length of the coupling 66. All or a portion of the coupling 66 is formed from a flexible material, such as rubber, that allows the coupling 66 to deform in response to forces exerted on the coupling 66 and recover its shape following the force being removed. The coupling 66 has a sliding region 82 formed on an outer surface 84 of the coupling 66 that can be defined between an enlarged diameter portion 86 of the coupling 66 and a coupling lip 88 at one end 90 of the coupling 66. The sliding region 82 has a smaller diameter than both the enlarged diameter portion 86 and the coupling lip 88, allowing for a locking ring 92 (shown in FIGS. 2 and 5-8) to slide along the sliding region 82 while being bound between the enlarged diameter portion 86 and coupling lip 88, i.e., the locking ring 92 has an inner diameter that is roughly equal to or greater than the diameter of the sliding region 82 but smaller than the diameters of the enlarged diameter portion 86 and coupling lip 88. In other words, the locking ring 92 can slide along the sliding region 82 but cannot slide off the sliding region 82 onto the enlarged diameter portion 86 or coupling lip 88. Optionally, if the enlarged diameter portion 86 and/or the coupling lip 88 are deformable, the enlarged diameter portion 86 and the coupling lip 88 can bound the locking ring 92 onto the sliding region 82 in a non-deformed or deformed state. One or more locking projections 94 can be formed on the sliding region 82 and have a ramped shape that interferes with the locking ring 92 freely sliding across an entirety of the sliding region 82, but still allow the locking ring 92 to slide over the locking projection(s) 94 if the locking ring 92 is sufficiently forced past the locking projection(s) 94 along the sliding region 82, which will be described further herein. An inner surface 96 of the coupling 66 has an inner lip 98 formed thereon that allows the coupling 66 to lock onto the port 68 of the metering device 48, which will be described further herein. While the inner lip 98 is shown as a single lip extending along an inner circumference of the inner surface 96, the inner lip 98 can also be formed by a series of inner lip segments circumferentially spaced from one another along the inner surface 96. An inner threaded portion 100 can be formed on an interior surface 102 of the enlarged diameter portion 86 that can interact with threading 104 (shown in FIGS. 6 and 8) formed on the hose 64 to lock the hose 64 to the coupling 66.

Figure 5:
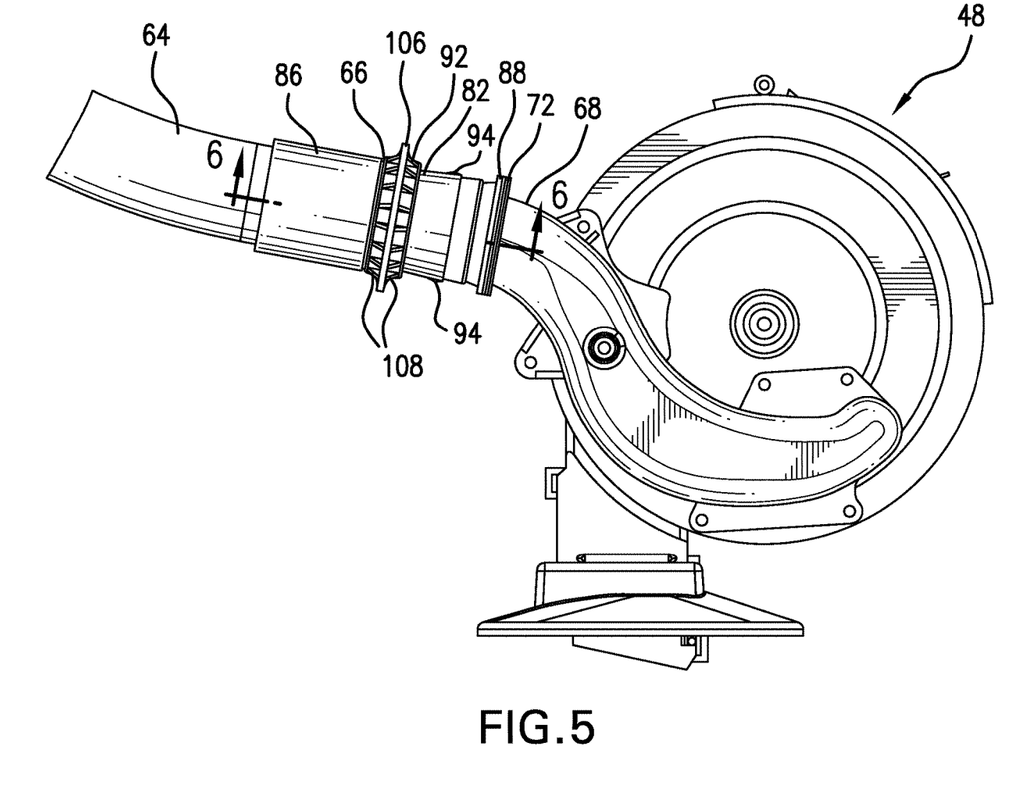
FIG. 5 is a side view of the metering device shown in FIG. 2 with the coupling shown in FIGS. 4A and 4B grasped on but not locked to the port of the metering device.
Figure 6:
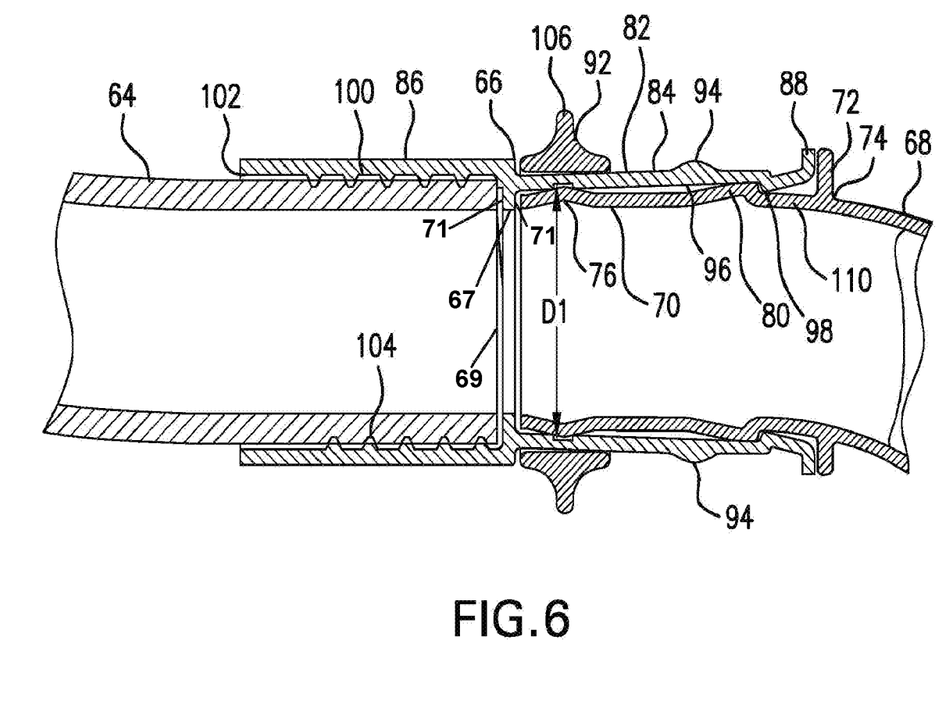
FIG. 6 is a cross-sectional view of the coupling, hose and port shown in FIG. 5 taken along line 6-6.

Referring now to FIGS. 5 and 6, the coupling 66 is shown grasping onto the port 68 of the metering device 48 to connect the hose 64 to the channel 70, but the coupling 66 can be freely removed from the port 68 by pulling the coupling 66 away from the port 68. The coupling, 66 has an inner separation lip 67 positioned between the end 78 of the port 68 and the end 69 of the hose 64. The end 78 of the port 68 and the end 69 of the hose 64 are positioned near opposite sides 71 of the inner separation lip 67 of the coupling 66 (FIG. 6). The locking ring 92, which can have a band 106 and ribs 108 on its outer diameter that can be gripped by a user, is in an unlocked position in FIGS. 5 and 6 so the coupling 66 can be freely deformed such that the inner lip 98 can slide off the port 68 by pulling the coupling 66 away from the port 68. As can be seen in FIG. 6, the port 68 can have a locking region 110 defined between the ramped portion 80 and port lip 72 that the inner lip 98 of the coupling 66 can be advanced onto when the coupling lip 88 is pressed against the port lip 72, at which point the coupling 66 can no longer be easily advanced along the port 68 due to the port lip 72 contacting the coupling lip 88 and interfering with further advancement.

Figure 7:
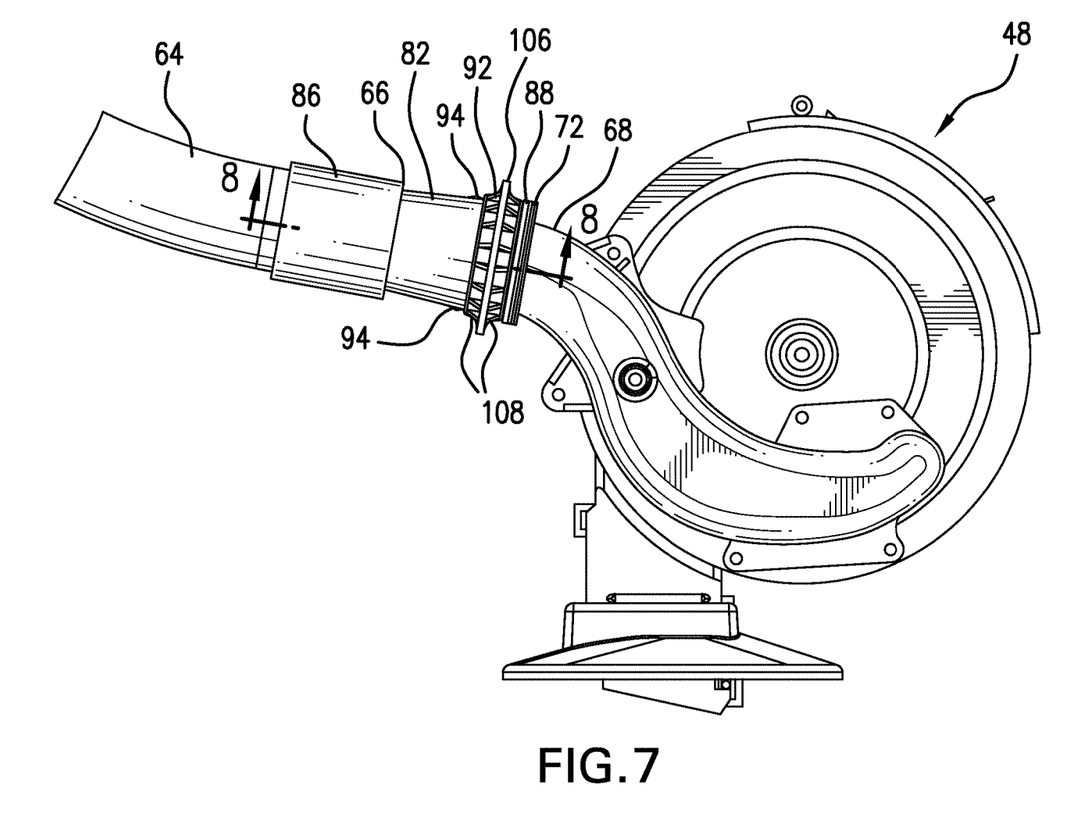
FIG. 7 is a side view of the metering device shown in FIGS. 2 and 5 with the coupling locked onto the port of the metering device.
Figure 8:
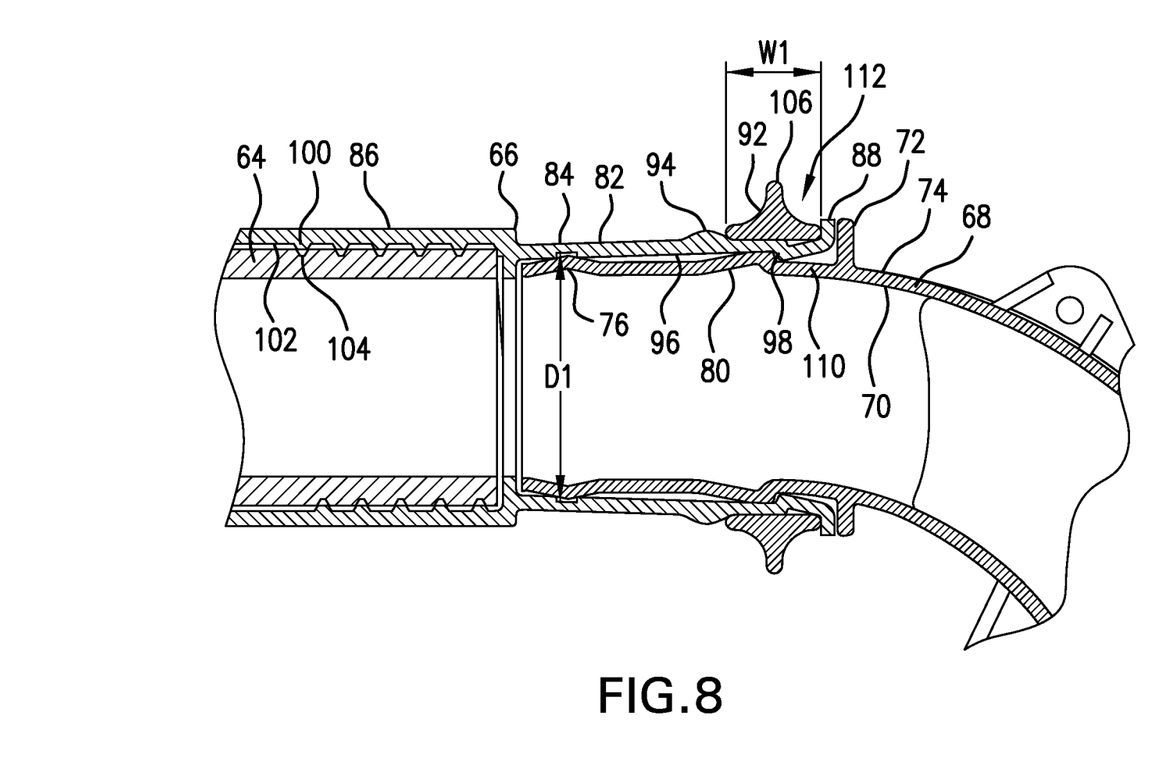
FIG. 8 is a cross-sectional view of the coupling, hose and port shown in FIG. 7 taken along line 8-8.

Referring now to FIGS. 7 and 8, the coupling 66 is shown locked onto the port 68 of the metering device 48 due to the locking ring 92 being in a locked position that interferes with the coupling 66 deforming to allow the inner lip 98 off the port 68. As can be seen in FIG. 8, the locking ring 92 has a ring width W1 that allows the locking ring 92 to contact the outer surface 84 of the sliding region 82 above where the inner lip 98 is formed on the inner surface 96, keeping the locking ring 92 in contact with the outer surface 84 to stiffen the coupling 66 adjacent the inner lip 98 so that the coupling 66 cannot deform to allow its inner lip 98 off the port 68. In this sense, the inner lip 98 becomes locked to the port 68 due to being constrained in the locking region 110 of the port 68 and the coupling 66 not being able to deform, as it normally would if the locking ring 92 was not stiffening the coupling 66, to a shape that allows the inner lip 98 to be removed from the locking region 110. The locking ring 92 therefore prevents the coupling 66 adjacent to the inner lip 98 from deforming to remove the inner lip 98 from the port 68 while the inner lip 98 pressing against the boundary of the locking region 110 (which is the ramped portion 80) prevents the coupling 66 from being pulled off the port 68. The ring width W1 of the locking ring 92 can be chosen so that the locking ring 92 is contacting both the coupling lip 88 and the locking projections 94 at the same time, keeping the locking ring 92 in place until a user pulls the locking ring 92 back toward the enlarged diameter portion 86 of the coupling 66 with sufficient force to get past the locking projections 94. Further, the flared portion 76 of the port 68 can have a flared diameter D1 that sufficiently expands the flexible material of the coupling 66 to produce an air tight seal between the flared portion 76 and the material of the coupling 66 that is expanded by the flared portion 76. This can allow the flared portion 76 to create the air tight seal between the channel 70 and the coupling 66, while the coupling 66 as a whole is locked onto the port 68 by the interaction of the inner lip 98 with the port 68 and the locking ring 92 preventing the coupling 66 being deformed to allow the inner lip 98 from coming off the port 68. In this sense, the portion of the coupling 66 with the sliding region 82 and inner lip 98 and the locking ring 92 can form a locking mechanism 112 with the outer surface 74 of the port 68 to prevent the coupling 66 from being pulled off of the port 68. While the coupling 66 is described as locking onto the port 68 of the metering device 48, it should be appreciated that the coupling 66 can be locked onto any surface using the locking ring 92 where the surface has some type of feature that prevents the inner lip 98 of the coupling 66 from being pulled away from the surface when the locking ring 92 is in the locked position. Thus, the outer surface 74 of the port 68 can also be referred to as a locking surface, generically.

Figure 9:
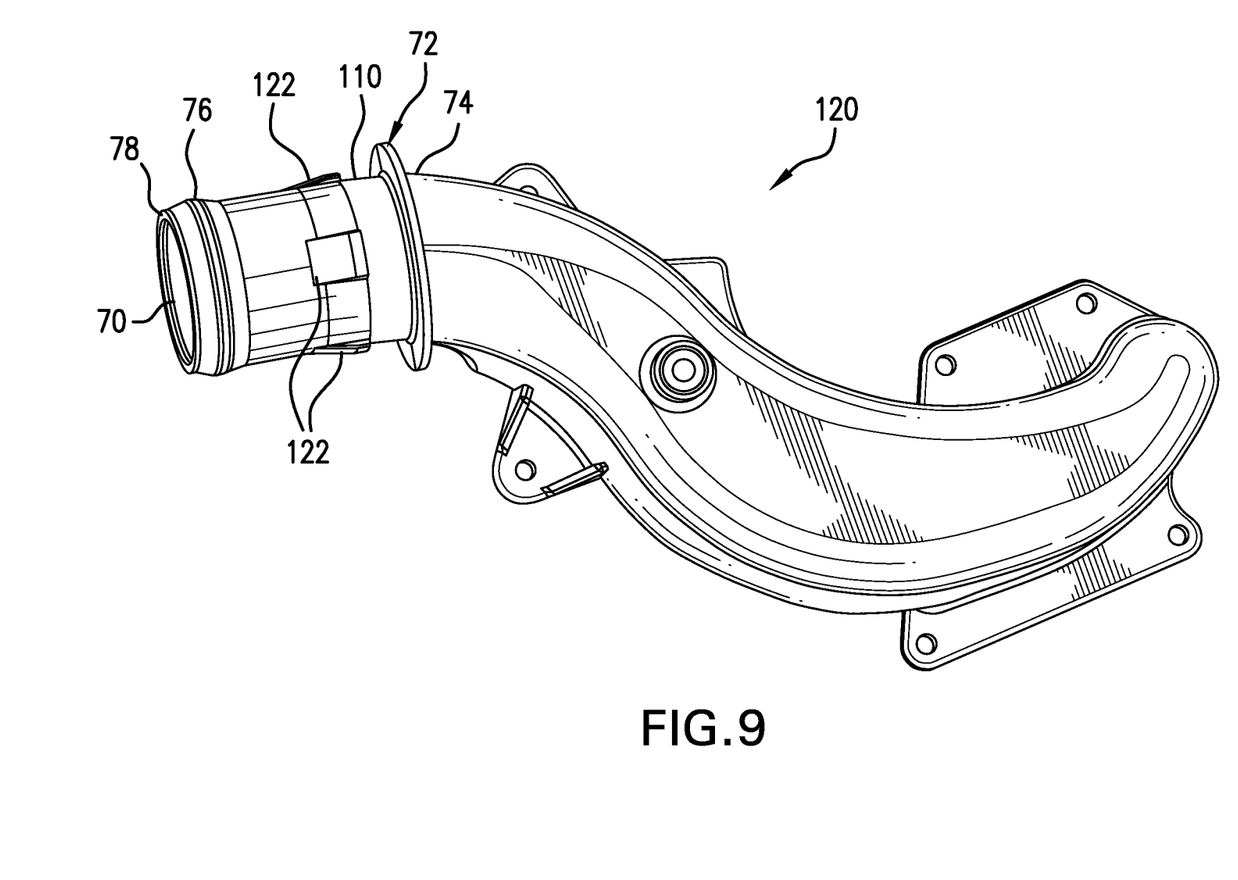
FIG. 9 is a side view of another embodiment of a port of a metering device included in the row unit shown in FIG. 2.

Referring now to FIG. 9, another embodiment of a port 120 according to the present invention is shown that is a modified version of the port 68 shown in FIG. 3. For convenience of description, all similar features between the port 68 shown in FIG. 3 and the port 120 shown in FIG. 9 are given identical reference numerals. To modify the port 68 shown in FIG. 3 to produce the port 120 shown in FIG. 9, the ramped portion 80 of the port 68 has been replaced with a series of ramped projections 122, shown as lugs, circumferentially spaced from one another along the outer surface 74 of the port 120. The lugs 122 can be spaced about the circumference of the port 120 in any desired manner and any number of lugs 122, including a single lug, can be used. The lug(s) 122 will therefore take the place of the ramped portion 80 to define one boundary of the locking region 110, with the port lip 72 defining the other boundary. When the coupling 66 is grasped onto the port 120 and the locking ring 92 is in the locked position, the lug(s) 122 will prevent the inner lip 98 of the coupling 66 from being able to freely slide off the port 120 and the locking ring 92 will prevent the coupling 66 from deforming so that the inner lip 98 can be advanced past the lug(s) 122.

Figure 11A:
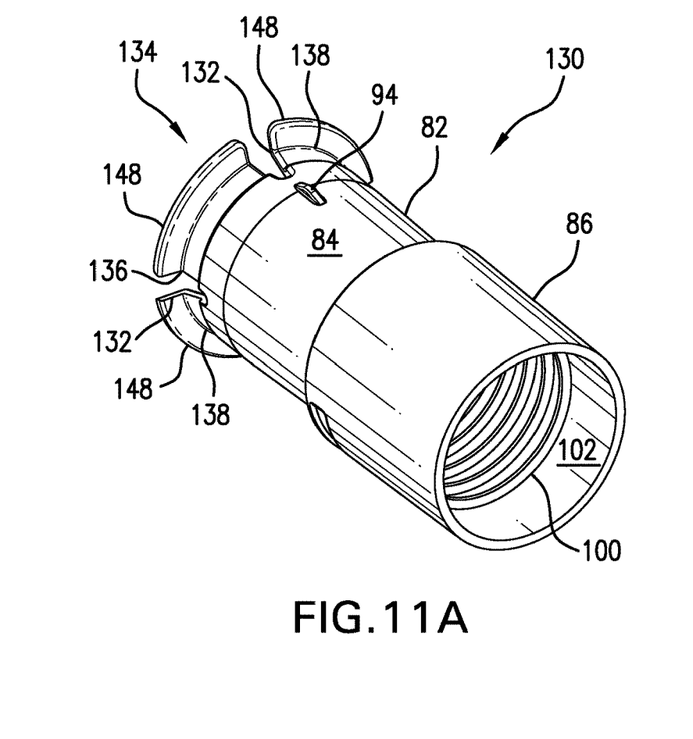
FIG. 11A is a perspective view of another embodiment of a coupling formed according to the present invention.
Figure 11B:
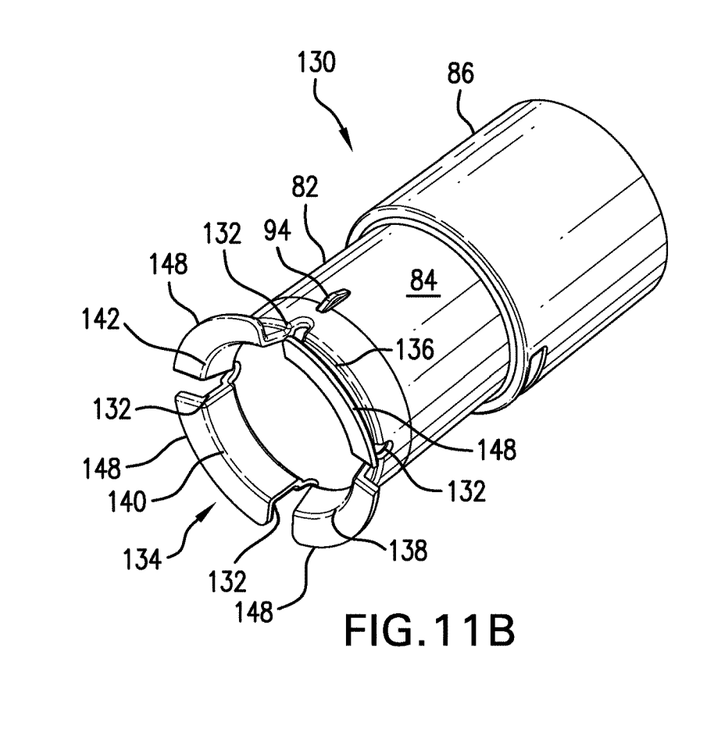
FIG. 11B is another perspective view of the coupling shown in FIG. 11A.

Referring now to FIGS. 11A and 11B, another embodiment of a coupling 130 formed according to the present invention is shown. For convenience of description, all similar features between the coupling 66 shown in FIGS. 2 and 4A-8 and the coupling 130 shown in FIGS. 11A and 11B are given identical reference numerals. As can be seen, the coupling 130 has slots 132 formed therein so the coupling 130 at one end 134 is split into separate segments 136, 138, 140, and 142. It should be appreciated that the split end 134 of the coupling 130 can be split into as many segments as desired and the segments 136, 138, 140, and 142 can be of equal or differing size. At least one of the segments 136, 138, 140, 142 has an inner lip 144 formed on an interior surface 146 thereof, but two or more of the segments 136, 138, 140, 142 can have an inner lip if desired. The inner lip(s) 144 of the segment(s) 136, 138, 140, 142 functions similarly to the inner lip 98 to prevent the coupling 130 from coming off a port when the locking ring 92 prevents the coupling 130 from deforming to allow the inner lip(s) 144 to come off the port. Each segment 136, 138, 140, 142 can also optionally have a coupling lip portion 148, with the coupling lip portion(s) 148 of the segment(s) 136, 138, 140, 142 together acting in unison analogously to the coupling lip 88 of the coupling 66.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planter, comprising:
    a chassis;
    a pneumatic system carried by the chassis;
    at least one row unit carried by the chassis, the row unit including:
        a unit body;
        a metering unit carried by the unit body;
        a port with a channel formed therein connected to the metering unit and having a spaced-apart free end;
        a hose connected to the pneumatic system and having a free end which extends near to the row unit; and
        a flexible coupling configured to be positioned over the free end of the port and the free end of the hose,
        wherein the flexible coupling, when positioned over the free end of the port and the free end of the hose, positions each free end near each other, the flexible coupling including an inner separation lip which provides a separation between the free end of the port and the free end of the hose, such that the free end of the port and the free end of the hose are each positioned near opposite sides of the inner separation lip of the flexible coupling, so that neither any portion of the free end of the port nor the free end of the hose directly contacts or overlaps each other, the flexible coupling releasably coupling the port and the hose together to permit airflow from the pneumatic system therethrough.

2. The agricultural planter according to claim 1, wherein the flexible coupling further comprises
    an inner lip formed on an inner surface of the flexible coupling which assists in holding flexible coupling to an outer surface of the free end of the port, the flexible coupling including a locking projection formed on an outer surface of the flexible coupling, a coupling lip and a sliding region formed on the outer surface; and
    a locking ring bound within the sliding region of the flexible coupling, the locking ring being slidable across the sliding region between a locked position and an unlocked position, the locking ring preventing the flexible coupling from deforming to allow the inner lip of the flexible coupling off of the free end of the port while in the locked position,
    wherein the port includes a flared portion, and the flared portion of the port has a flared diameter which seals against the inner surface of the flexible coupling, and wherein the sliding region is defined between the coupling lip and an enlarged diameter portion of the flexible coupling.

3. The agricultural planter according to claim 2, wherein the locking ring is in the locked position when the locking ring is placed between the locking projection and the coupling lip.

4. The agricultural planter according to claim 2, wherein the port has a port lip formed thereon, the coupling lip being pressed against the port lip.

5. The agricultural planter according to claim 2, wherein the flared portion forms an airtight seal between the outer surface of the port and the flexible coupling.

6. The agricultural planter according to claim 2, wherein the port has a ramped portion and a port lip formed thereon, the inner lip of the flexible coupling locking onto the port between the ramped portion and the port lip.

7. The agricultural planter according to claim 2, wherein the port has at least one ramped projection and a port lip formed thereon, the inner lip of the flexible coupling locking onto the port between the at least one ramped projection and the port lip.

8. The agricultural planter according to claim 7, wherein the port has a plurality of ramped projections formed circumferentially spaced from one another on the port.

9. The agricultural planter according to claim 2, wherein the flexible coupling has an inner threaded portion interacting with threadings of the hose.

10. The agricultural planter according to claim 2, wherein the flexible coupling has a split end with at least two segments, at least one of the segments including at least one of the inner lip and a coupling lip portion.

11. A locking mechanism for a metering unit of a row unit of an agricultural implement, the locking mechanism comprising:
    a metering unit carried by the row unit;
    a port with a channel formed therein connected to the metering unit and having a spaced-apart free end;
    a hose connected to a pneumatic system and having a free end which extends near to the metering unit; and
    a flexible coupling configured to be positioned over the free end of the port and the free end of the hose;
    wherein the flexible coupling, when positioned over the free end of the port and the free end of the hose, positions each free end near each other, the flexible coupling including an inner separation lip which provides a separation between the free end of the port and the free end of the hose, such that the free end of the port and the free end of the hose are each positioned near opposite sides of the inner separation lip of the flexible coupling, so that neither any portion of the free end of the port nor the free end of the hose directly contacts or overlaps each other, the flexible coupling releasably coupling the port and the hose together to permit airflow from the pneumatic system therethrough.

12. The locking mechanism according to claim 11, wherein the flexible coupling further comprises
    an inner lip formed on an inner surface of the flexible coupling which assists in holding the flexible coupling to an outer surface of the free end of the port, the flexible coupling including a locking projection formed on an outer surface of the flexible coupling, a coupling lip and a sliding region formed on the outer surface; and
    a locking ring bound within the sliding region of the flexible coupling, the locking ring being slidable across the sliding region between a locked position and an unlocked position, the locking ring preventing the flexible coupling from deforming to allow the inner lip of the flexible coupling off of the free end of the port while in the locked position, wherein the port includes a flared portion, and the flared portion of the port has a flared diameter which seals against the inner surface of the flexible coupling, and wherein the sliding region is defined between the coupling lip and an enlarged diameter portion of the flexible coupling.

13. The locking mechanism according to claim 12, wherein the locking ring is in the locked position when the locking ring is placed between the locking projection and the coupling lip.

14. The locking mechanism according to claim 12, wherein the flared portion forms an airtight seal between the flexible coupling and the outer surface of the port.

15. The locking mechanism according to claim 12, wherein the outer surface of the port has a ramped portion and a port lip formed thereon, the inner lip of the flexible coupling locking onto the outer surface of the port between the ramped portion and the port lip of the outer surface.

16. The locking mechanism according to claim 12, wherein the outer surface of the port has at least one ramped projection and a port lip formed thereon, the inner lip of the flexible coupling locking onto the outer surface of the port between the at least one ramped projection and the port lip of the outer surface.

17. The locking mechanism according to claim 12, wherein the flexible coupling has an inner threaded portion.

\* \* \* \* \*